Nov. 30, 1926.

G. P. WILSON 1,608,827

SYSTEM OF CONTROL

Filed August 28, 1924    3 Sheets-Sheet 1

WITNESSES
R. J. Butler.

INVENTOR
Golder P. Wilson.
BY
ATTORNEY

Nov. 30, 1926.

G. P. WILSON

SYSTEM OF CONTROL

Filed August 28, 1924   3 Sheets-Sheet 2

WITNESSES:

INVENTOR
Golder P. Wilson.
BY
ATTORNEY

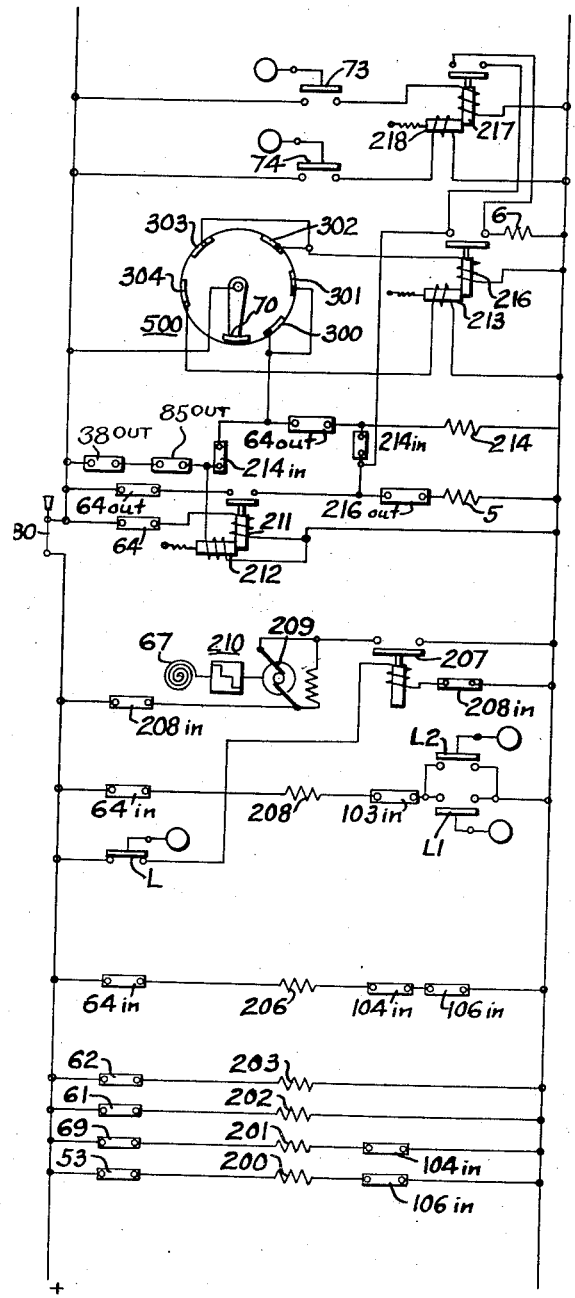

Patented Nov. 30, 1926.

1,608,827

UNITED STATES PATENT OFFICE.

GOLDER P. WILSON, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed August 28, 1924. Serial No. 734,646.

My invention relates to systems of motor control and it has particular relation to such systems as are employed in connection with the operation of steel mills.

The object of my invention is to provide a system of control whereby the functions performed by various operators may be automatically controlled by a single operator.

Figure 1:
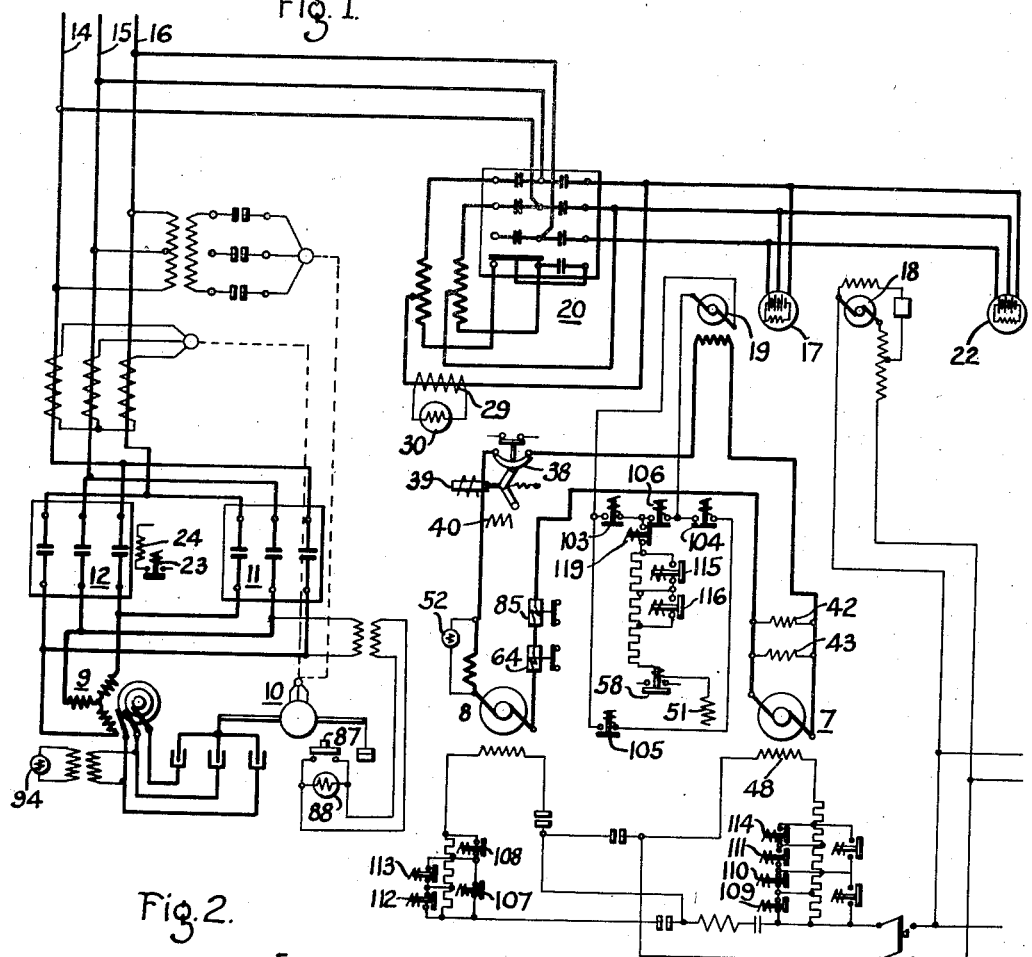
Figure 2:
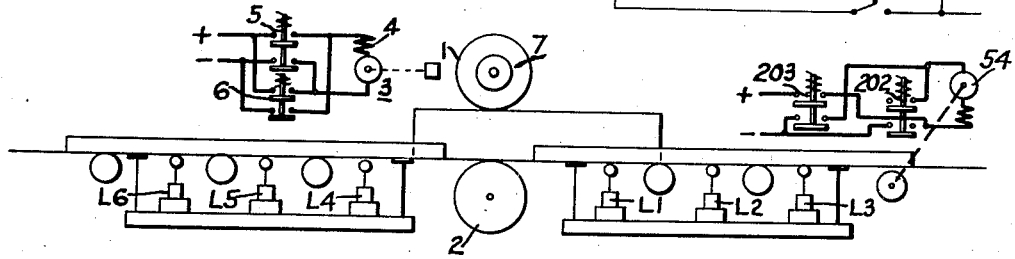
Figure 3:
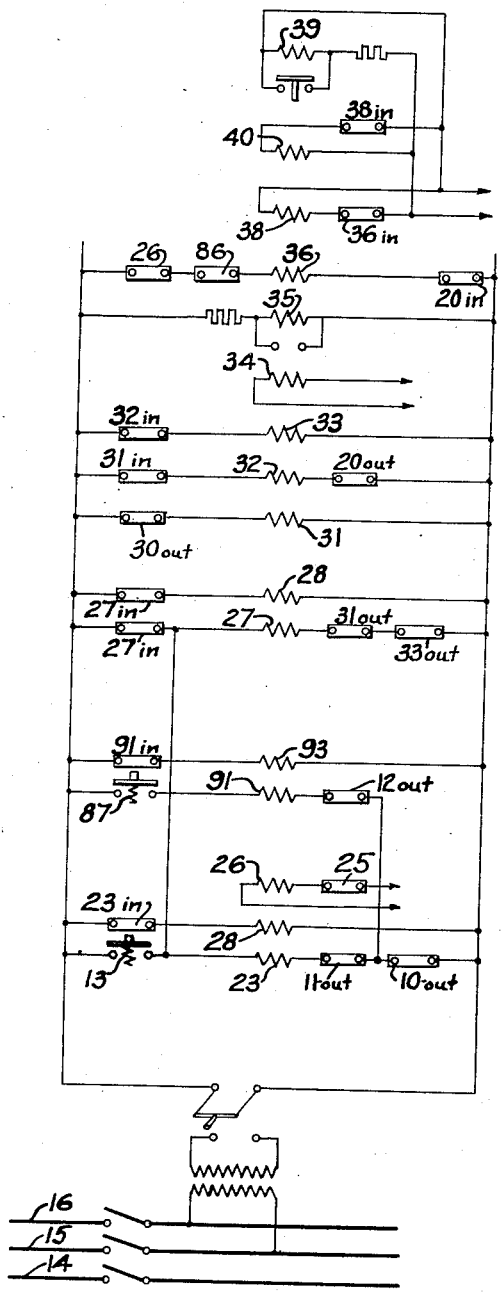
Figure 4:
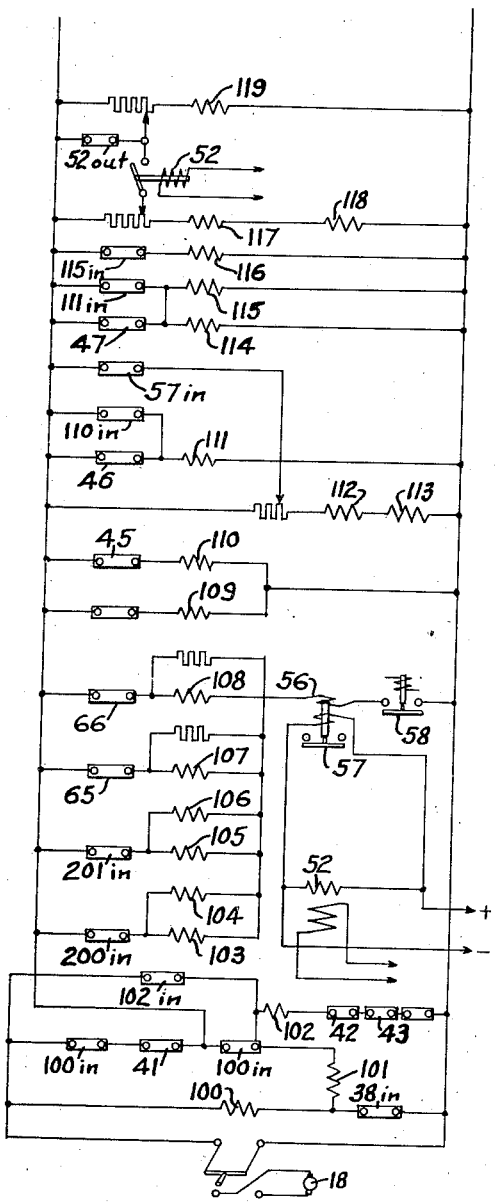

My invention will be described with reference to the acompanying drawing in which Fig. 1 illustrates the mechanical arrangement ordinarily provided for a reversing steel mill, Fig. 2 is a diagrammatic view of circuits and apparatus embodying my invention, and Figs. 3, 4 and 5 represent, diagrammatically, control circuits employed in connection with the apparatus illustrated in Fig. 2.

In Figs. 1 and 2, a pair of rolls 1 and 2 are provided for forming or rolling a steel billet in the customary manner. The billet is carried to and from the rolls by a familiar system of table rollers, and the upper main roll 1 is raised and lowered as usual by means of a screw-down device comprising a motor 3 having a field-magnet winding 4 and reversing switches 5 and 6 therefor. A main or reversing motor 7 is controlled by means of a variable voltage generator 8. The generator 8 is driven by means of an alternating current motor 9 that is controlled by a slip regulator 10 and reversing breakers 11 and 12. These breakers are remotely controlled from a push button station 13 in the operator's pulpit.

The alternating current source of energy comprises conductors 14, 15 and 16. An exciter set comprises a synchronous driving motor 17 and exciter generators 18 and 19. The synchronous motor 17 is started and controlled by means of an auto-starter 20 and a current limit relay 30. The starter is also conveniently employed for operating auxiliary apparatus such as a blower motor 22. The mill is started and the various operations required for rolling a billet, are controlled by a single operator automatically in accordance with a predetermined sequence.

The starting operation will first be described primarily in connection with Figures 2 and 3. The closure of push button switch 13 effects the operation of control relay 23 which in turn energizes the closing coil 24 of the forward breaker 12. This breaker is also equipped with a trip coil 25 and a low voltage coil 26. With the breaker 12 closed, a circuit is set up for the main alternating current motor 9 from line conductors 14, 15 and 16. The acceleration of this motor is effected automatically, in a familiar manner, by means of the slip regulator 10.

Another circuit is also established by the closure of the push button 13 for the operating coil of a relay 27. A circuit for the starting coil 28 of the auto-starter 20 extends through relay 27 and the closure of the auto-starter establishes starting connections for the motor 17 of the exciter set and for the blower motor 22. These synchronous motors are accelerated automatically in accordance with current conditions as described in the copending application of R. J. Wensley, Serial No. 386,322, filed July 25, 1923. A current transformer 29 is located in the starting taps or conductors of the auto starter 20 for the purpose of controlling the operating coil of a current relay 30. This relay is provided with back-contact members that are closed when the relay is de-energized or when the starting current drops to a value corresponding to the synchronous speed of the motor at no load. In this manner, the operating coil of relay 31 is energized, the closure of which opens the circuit of the starting coil 28 of the auto starter 20. When the auto starter is de-energized, a circuit is established through interlock 20-out extending through the operating coil of a relay 32 which controls the running coil 33 of the auto starter. The completion of the running circuit applies full voltage to the motors 18 and 22. The running side of the auto-starter is also equipped with a trip coil 34 and a low voltage coil 35. An interlock 20-in is closed by the auto-starter on its running side, thereby energizing the operating coil of a relay 36 which in turn completes a circuit for the closing coil of a circuit breaker 38 that is connected in the loop circuit between the reversing motor 7 and the generator 8. The circuit breaker 38 is also provided with a low voltage coil 39 and a shunt trip coil 40. When the breaker 38 is closed, a circuit is established for the operating coil of relay 100 extending through the circuit breaker interlock 38-in.

A master switch (not shown) located in the operator's pulpit is provided with an interlock 41 that is closed when the master switch is in its "off" position (see Fig. 4). A circuit is therefore established for the operating coil of relay 101 through interlocks 38 in, 100-in and 41. A circuit for the operating coil of a re-set relay 102 extends through interlocks 100-in interlock 41 and through the overload and over-voltage relays 42 and 43. This re-set relay 102 is self-holding through its interlock 102-in, when the master switch interlock 41 is open. The generator field circuit breaker 101 is also controlled by the relay 102 and will therefore be tripped in the event of overload or overvoltage on the generator, after which it is necessary to return the master switch to the "off" position and close the interlock 41 in accordance with familiar practice.

Contactors 109, 110, 111, 114, 115 and 116 are closed by means of normally closed switch members 45, 46 and 47 of the motor-operated drum controller 210 (Fig. 5). Contactors 109, 110, 111, 114 cut out sections of resistance in field-winding 48 of reversing motor 7, thereby subjecting this motor to full-field excitation, and similarly contactors 115 and 116 cut out resistance in the reversing field winding 51 of said motor. Contactor 119 is also closed through the contact members of a reverse-power relay 52 whereby the field winding 51 is energized through contactor 119 at all times except during reversal of power or deceleration. The object, therefore, is to de-energize the variable potential field of motor 7 by means of the reverse-power relay whereby reversal of said motor may be accomplished as quickly as required.

The reversing motor 7 now has full-field strength but receives no operating current until the generator field is excited. The steel is next brought from the "soaking pits" or heating ovens and placed on the table rolls. The operator in the pulpit then manipulates the table roll motors 54 in a forward direction in the usual manner and closes drum-switch 53 whereby a relay 200 is operated to effect the closure of "forward" reversing contactors 103 and 104. A circuit for the operating coils of these contactors also extends through the closing coil 56 of the field-forcing relay 57 and through the contact members of the field-protective relay 58. Field relays 112 and 113 are also closed through the field-forcing relay interlock 57-in to insure a rapid building up of generator voltage. At the proper voltage value, the field-forcing relay opens in accordance with familiar practice. Meanwhile, suitable voltage has been impressed upon the armature of the reversing motor 7, which is therefore accelerated to a predetermined speed.

Contactor 202 for controlling the forward operation of the table-roll motor is energized through master-switch contacts 61, whereby the table-rolls are operated in a forward direction to carry the steel to the main rolls. When steel enters the rolls, the armature current of motor 7 immediately rises to a value sufficient to operate a load relay 64 which energizes the operating coil of relay 208 through contact member 64-in. Relay 208 in turn effects the energization of motor 209 of the motor-operated drum controller. The operation of this controller first closes contact members 65 to energize the closing coil of contactor 107 which cuts out another portion of the generator field resistor thereby effecting an increase in the speed of motor 7.

Continued operation of the drum controller effects the closure of contact members 66 thereby energizing the closing coil of contactor 108 cutting out another step of generator field resistance to still further accelerate the reversing motor 7.

At this point, it may be assumed that full generator voltage obtains, and increased motor speed is next effected through control of the motor field excitation. Continued operation of the motor-operated drum controller effects the opening of contacts 45 to de-energize contactors 110 and 115 which open to insert resistance in the constant and variable potential fields of the motor 7. When drum contact members 46 open, contactor 111 drops out inserting additional resistance in the constant potential motor field. Drum contact members 47 next open to de-energize contactors 114 and 115. The opening of contactor 115 also effects the opening of contactor 116. Contactor 111 is also interlocked with contactors 114 and 115 whereby the opening of contactor 111 is insured prior to the opening of contactors 114 and 115. The opening of contactors 114, 115 and 116 inserts additional resistance in both the constant potential and the variable potential field-windings 48 and 51 of the reversing motor 7, which then operates at its maximum speed.

It is presumed that the steel in the main rolls has not reached a point where deceleration takes place or that it has passed out of the rolls entirely. Deceleration is predetermined in accordance with proper operation by means of limit switches $L_1$ to $L_6$ located at suitable points between the table rolls and operated by means of idle rolls in a manner disclosed in the copending application of Wilfred Sykes, Serial No. 394,550, filed July 7, 1920, which has matured into Patent No. 1,498,134. When the steel is on the rolls, the idle rolls are pushed down and the limit switches are closed and, as the steel passes over the rolls, the switches are successively opened to first slow down and then reverse the operation of motor 7. The opening of switch L₄ de-energizes the operating coil of relay 208 to de-energize the motor 209 of the drum controller.

The motor for operating the drum controller is equipped with a spiral spring 67 which effects reversal of the drum rapidly when the motor 209 is de-energized, thereby insuring rapid de-celeration of the reversing motor 7. When the steel passes out of the rolls, load relay 64 is de-energized sufficiently to open and motor 7 comes to rest. Switch 69 is closed by the operator's master controller to energize relay 201. This relay effects the closure of reversing contactors 105 and 106 to start the motor 7 in the opposite direction. The steel billet now enters the rolls traveling in the opposite direction, again energizing relay 64 and closing contactor 208 to again operate the motor operated drum controller. The steel then passes through the rolls and is again stopped in its reverse movement, in a manner corresponding to the previously described "forward" operation.

When the first pass of the steel is complete, the screw-down motor 3 automatically adjusts the rolls for the next and all succeeding passes. The automatic operation of the screw-down motor is accomplished in the following manner. When the steel first enters the rolls and also on all succeeding passes, the load relay 64 operates to energize a pilot relay 211 which latches itself in and is provided with a shunt trip coil 212. When the steel passes out of the rolls, the motor armature current drops and load relay 64 again opens. When relay 64 is open, a circuit is established for the operating coil of contactor 5 through interlock 64-out and through relay 211 and interlock 216-out. The closing of contactor 5 energizes the screw-down motor 3 by which is operated a drum type limit-switch or controller 500. The contact finger 70 of the drum controller moves in accordance with the position of the roll 1 and in so doing the finger 70 passes over the several drum contact segments. The first operation of the screw-down motor therefore causes finger 70 to engage contact segment 300 to energize relay 214 which energizes the re-set coil 212 of relay 211 through interlock 214-in. The screw-down motor continues to operate actuating the finger 70 which presently passes over contact segment 300, whereupon relay 214 again opens, which opens contactor 5 and stops the screw-down motor. This operation constitutes the first adjustment of the rolls preliminary to the next pass of steel which is effected in a manner previously described. The foregoing operation is repeated until the steel is turned for rolling on another side. For example, suppose this operation occurs when the contact finger 70 has passed the drum segment 301 and the finger has engaged contact segment 302. This engagement effects the energization of relay 216. The finger 70 continues to travel until it is adjacent to contact segment 303. The steel entering the rolls operates the load relay 64 and relay 211 as previously described. Relay 216 is closed and also latches in, whereupon contactor 6 closes to effect reversal of the screw-down motor 3 and separate the rolls 1 and 2. Finger 70 then engages contact segment 303 also establishing a circuit for the operating coil of contactor 6. The finger 70 continues to move until it is disengaged from segment 303 and engages segment 304 to energize the reset coil 213 of relay 216. When finger 70 disengages segment 303, relay 214 is de-energized which in turn effects the opening of contactor 6. The screw-down motor 3 is thus stopped and the control apparatus is in its original condition for the next screw-down operation. These operations are automatically repeated until the steel is completely finished. "Down" limit switch 73 on the screw-down device is then closed to energize relay 217 which latches itself in and again starts the screw-down motor 3. When the upward limit of roll 1 is reached, limit switch 74 closes thereby energizing re-set coil 218 of relay 217. The screw-down motor then stops and the rolls are ready for a new billet.

A single-pole single-throw knife switch 80 is provided for manual operation of the screw-down device; the opening of this switch breaks one side of the control circuit to prevent automatic relay operation. An interlock 64-in on the load relay 64 prevents operation of relay 214 and hence of the screw-down device while the steel is in the rolls, thus preventing damage to the rolls by closing the knife switch 80 while steel is passing through. The operator therefore can change from automatic to manual control and vice-versa without interrupting the sequence of the automatic features.

38-out is an auxiliary interlock on the circuit breaker 38 that is closed when the breaker is opened, and interlock 85-out is actuated by the overload relay. The closing of these interlocks resets 211 thereby preventing operation of the screw-down device in the event of the opening of the overload relay 85 or the circuit breaker 38 while steel is in the rolls.

The circuit breaker 38 cannot be re-closed until the table-rolls controller is in the "off" position. This operation is effected through re-set interlock 86, in a familiar manner. In this position of the controller, the reversing motor 7 is idle by reason of the fact that no current can traverse the armature while reversing contactors 103, and 104, or 105 and 106, are open. In backing steel out of the rolls, the motor load is insufficient to cause an operation of the load relay 64 and, therefore, the screw-down device will not operate again until the steel has passed through the rolls in a proper direction.

In order to stop the rolls quickly, motor 7 may be plugged manually, by the operator, upon the closure of a push button switch 87 which effects the de-energization of the low voltage coil 88 of the slip regulator 10. Low voltage coil 26 of the forward breaker 12 is also deenergized. Control relay 91 is energized through the push-button 87 and the interlock 12-out of the forward breaker and the interlock 10-out of the slip regulator. Maximum resistance is thereby reinserted in the secondary circuit of the motor 9 during the plugging operation. The operation of relay 91 energizes closing coil 93 of the reverse breaker 11 to "plug" the motor. The instant the motor is plugged, the voltage in the secondary rises to approximately double the "lock" voltage and gradually decreases as the motor slows down, reaching the lock voltage value when the motor comes to rest. Voltage relay 94 closes at the lock voltage value, thereby tripping the reverse circuit breaker 11. This operation is accomplished automatically in case of a hot bearing by means of a thermostat having contact members 87 functioning in a manner identical with the push button operation just described.

The advantages obtained through the automatic operation of steel mill equipment in accordance with my invention will be appreciated, particularly in view of the fact that a single operator is enabled to perform functions heretofore requiring three attendants.

I have described my invention in preferred form but desire that it shall be limited only in accordance with the scope of the appended claims.

I claim as my invention:—

1. The combination with main rolls and table rolls, of electro-responsive operating means therefor, an exciter set for said means, a switch for controlling the exciter and said means, a screw-down motor for the main rolls and load responsive means for controlling the screw-down motor.

2. The combination with a pair of main rolls and a reversing motor therefor, of means for controlling the motor, a screw-down device for said rolls, and load responsive means for operating said device after each operation of the reversing motor.

3. The combination with a pair of main rolls and a reversing motor therefor, of means for automatically slowing down the reversing motor after each operation therefor, a screw-down device for said rolls, and load responsive means for operating said device after each operation of the reversing motor.

4. In a system for rolling steel billets, the combination with reversing-rolls and a motor therefor, of means operable in accordance with the position of the billet for controlling the motor, a screw-down device and means responsive to the motor load current for controlling said device.

5. The combination with main rolls and table rolls, of electro-responsive operating means therefor, an exciter set for said means, a switch for controlling the exciter and said means, a screw-down motor for the main rolls and means controlled in accordance with the relative positions of said rolls for controlling the screw-down motor.

6. The combination with a pair of main rolls and a reversing motor therefor, of means for controlling the motor, a screw-down device for said rolls, load responsive means for operating said device after each operation of the reversing motor and means controlled in accordance with the relative position of said rolls for controlling said device.

7. The combination with a pair of main rolls and a reversing motor therefor, of means for automatically slowing down the reversing motor after each operation therefor, of means for controlling the motor, a screw-down device for said rolls, load responsive means for operating said device after each operation of the reversing motor and means controlled in accordance with the relative position of said rolls for controlling said device.

8. In a system for rolling steel billets, the combination with reversing-rolls and a motor therefor, of means operable in accordance with the position of the billet for controlling the motor, a screw-down device and means responsive to the motor load current for controlling said device, and means controlled in accordance with the relative position of said rolls for controlling said device.

9. The combination with main rolls and table rolls, of variable voltage controlling means therefor, an exciter set for said means, a switch for controlling the exciter and said means, a screw-down motor for the main rolls and load responsive means for controlling the screw-down motor.

10. The combination with main rolls and table rolls, of electro-responsive operating means therefor, an exciter set for said means, a switch for controlling the exciter and said means, a screw-down motor for the main rolls and a current limit relay controlled by the first means for initiating the operation of the screw-down motor.

11. The combination with main rolls and table rolls, of variable voltage controlling means therefor, an exciter set for said means, a switch for controlling the exciter and said means, a screw-down motor for the main rolls and a current limit relay controlled by the first means for initiating the operation of the screw-down motor.

12. The combination with a pair of main rolls and a reversing motor therefor, of variable voltage means for controlling the motor, a screw-down device for said rolls, and a relay controlled by the reversing motor for initiating the operation of the screw-down after each operation of the reversing motor.

In testimony whereof, I have hereunto subscribed my name this 18th day of August, 1924.

GOLDER P. WILSON.